United States Patent Office 3,337,599
Patented Aug. 22, 1967

3,337,599
THIOETHYL THIOLSULFONATES
Joseph E. Dunbar, Midland, Mich., assignor to The Dow Chemical Company, Midland, Mich., a corporation of Delaware
No Drawing. Filed Oct. 4, 1965, Ser. No. 492,933
5 Claims. (Cl. 260—453)

The present invention is directed to substituted thioethyl thiolsulfonates corresponding to the formula

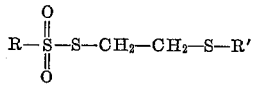

In this and succeeding formulae, R represents lower alkyl, naphthyl, phenyl and substituted phenyl and R' represents lower alkyl, phenyl and substituted phenyl. In the present specification and claims, substituted phenyl represents lower alkyl-phenyl, halophenyl and lower alkoxy-phenyl. The expressions lower alkyl and lower alkoxy are employed in the specification and claims to represent lower alkyl and lower alkoxy groups containing from 1 to 2 to 3 to 4 carbon atoms, inclusive, such as methyl, methoxy, ethoxy, propoxy, n - butoxy, sec. - butoxy and tert. - butoxy, ethyl, propyl, isopropyl butyl, sec. - butyl, tertiary butyl and halo is employed to represent chlorine, bromine, fluorine and iodine. The new compounds of the present invention are liquids and solids which are of low solubility in water and of high solubility in many organic solvents. The compounds are useful as parasiticides and are adapted to be employed for the control of a number of bacterial, plant and fungal organisms such as crabgrass, tomato, powdery mildew, soybeans, *Aerobacter aerogenes*, *Bacillus subtilis*, *Staphylococcus aureus*, *Candida pelliculosa*, *Pullularia pullulans*, rice blast and potato late blight.

In producing the novel thiolsulfonates of the present invention a 2 - chloro- or bromoethyl sulfide corresponding to the formula

X—CH₂—CH₂—S—R' wherein X represents chlorine or bromine, is reacted with an alkali metal salt of thiosulfonic acid corresponding to the formula

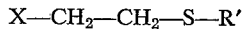

to produce the desired product and the alkali metal halide reaction byproduct. The reaction is conveniently carried out in a polar organic solvent such as ethanol, isopropanol, acetone, acetonitrile, methanol, aqueous acetone, aqueous ethanol, and aqueous methanol. The amounts of the reactants to be employed are not critical, some of the desired product being obtained when employing any proportions of the reactants. However, the reaction consumes the reactants in equimolar proportions and the use of the reactants in such proportions is preferred.

The reaction takes place smoothly at temperatures at which the alkali metal halide of reaction is formed and conveniently at temperatures between 30° and 140° C. In a preferred procedure, the reaction is carried out at temperatures between 60° and 90° C. In such a preferred method, it is oftentimes convenient to operate at the boiling temperature of the reaction mixture and under reflux. Cessation in the formation of the halide of reaction is evidence of completion of the reaction.

In carrying out the reaction, the reactants are mixed and contacted together in any convenient fashion and the resulting mixture maintained for a period of time in the reaction temperature range to insure completion of the reaction. Following the reaction, the reaction mixture is processed by conventional procedures to obtain the desired product. In some instances the alkali halide salt precipitates in the reaction mixture as a crystalline solid. In such cases, the reaction mixture is filtered while hot to remove the solid halide of reaction and the filtrate is then cooled. During the cooling the desired product precipitates in the filtrate as a crystalline solid or forms an organic oil layer which is collected by decantation or filtration. In another convenient procedure, the organic reaction medium can be removed by evaporation under reduced pressure, leaving the desired product as a residue. This residue can then be washed with water to remove the alkali halide of reaction. The product thus obtained can be employed in pesticidal application or further purified by conventional procedures such as recrystallization or washing with an organic solvent.

Representative thiosulfonic acid salts include sodium 2,4 - dichlorobenzenethiosulfonate, sodium 3,4,5 - trimethylbenzenethiosulfonate, potassium 2,4 - diethylbenzenethiosulfonate, potassium 4 - tert. - butylbenzenethiosulfonate, sodium 3,5 - difluorobenzenethiosulfonate, potassium 4 - iodobenzenethiosulfonate, sodium 5 - ethoxybenzenethiosulfonate, potassium 3,5 - dimethoxybenzenethiosulfonate, sodium 3,5,6 - tribromobenzenethiosulfonate, potassium 3,4 - diiodobenzenethiosulfonate, sodium 2,3,4,5,6 - pentamethylbenzenethiosulfonate and sodium 2,3,4,5,6 - pentachlorobenzenethiosulfonate. Representative 2 - haloethyl sulfides include 2 - chloroethyl (4 - chlorophenyl) sulfide, 2 - bromoethyl (3,4,5 - tribromophenyl) sulfide, 2 - bromoethyl n - butyl sulfide, 2 - chloroethyl (4 - n - butoxyphenyl) sulfide, 2 - chloroethyl (3,5 - diethoxyphenyl) sulfide and 2 - chloroethyl (2,3,4 - trifluorophenyl) sulfide.

The following examples are merely illustrative and are not intended to be limiting.

EXAMPLE 1

*2-(methylthio)ethyl methanethiolsulfonate*

Potassium methanethiolsulfonate (30.1 grams; 0.200 mole) and 2-chloroethyl methyl sulfide (22.1 grams; 0.200 mole) were contacted together in 500 ml. of ethanol with stirring and the resulting mixture heated at the boiling temperature and under reflux for 6.25 hours. During the reaction period potassium chloride precipitated in the reaction mixture as a crystalline solid. Following the reaction period, the reaction mixture was allowed to cool to room temperature and thereafter filtered to remove the potassium chloride by-product. The filtrate thus obtained was then subjected to evaporation in vacuo to remove the ethanol and obtain the desired 2-(methylthio)-ethyl methanethiolsulfonate product as a colorless oil, $n_D^{25}$ 1.5566. This oil was dissolved in ethyl ether and cooled in a Dry Ice-methylene chloride bath to produce colorless crystals melting at 4°–5° C. The 2-(methylthio)-ethyl methanethiolsulfonate product was found by combustion analysis to have carbon, hydrogen and sulfur contents of 25.92, 5.26 and 51.70 percent, respectively, as compared to the theoretical contents of 25.79, 5.41 and 51.63 percent, respectively, calculated for said product.

EXAMPLE 2

2-(methylthio)ethyl 4-methoxybenzenethiolsulfonate

Potassium 4-methoxybenzenethiolsulfonate (57.6 grams; 0.238 mole) and 2-chloroethyl methyl sulfide (26.2 grams; 0.238 mole) were dispersed in 600 milliliters of ethanol. The resulting reaction mixture was heated at the boiling temperature and under reflux with stirring for 9 hours. During the reaction, the potassium chloride byproduct precipitated in the reaction mixture. Following the reaction period, the reaction mixture was allowed to cool to room temperature, whereupon it was filtered to remove the potassium chloride byproduct. The filtrate, thus obtained, was then subjected to evaporation in vacuo to remove the ethanol and obtain an opaque oil. The oil was dissolved in benzene and filtered through diatomaceous earth to remove a finely divided insoluble component which appeared in the benzene solution. Following the filtration, the filtrate was subjected to evaporation in vacuo to obtain the 2-(methylthio)ethyl 4-methoxybenzenethiolsulfonate product as a pure yellow liquid, $n_D^{25}$ 1.6037. This compound was found by combustion analysis to have carbon, hydrogen and sulfur contents of 43.31, 5.08 and 34.45 percent, respectively, as compared to the theoretical contents of 43.14, 5.07 and 34.55 percent, respectively, calculated for said compound.

The following compounds of the present invention were prepared employing substantially the same procedure.

2-(methylthio)ethyl 4-iodobenzenethiolsulfonate (melting at 69–70° C.) and having carbon, hydrogen and sulfur contents of 29.1, 3.19 and 25.53 percent, respectively, as compared to the theoretical contents of 28.88, 2.96 and 25.70 percent, respectively, by reacting together 2-chloroethyl methyl sulfide and potassium p-iodobenzenethiolsulfonate.

2-(phenylthio)ethyl methanethiolsulfonate, $n_D^{25}$ 1.6080, and having a sulfur content of 38.35 percent as compared to the theoretical content of 38.72 percent by reacting together 2-bromoethyl phenyl sulfide and potassium methanethiolsulfonate.

2 - ethylthio)ethyl 3,4 - diethoxybenzenethiolsulfonate (molecular weight 350.5) by reacting together 2-bromoethyl ethyl sulfide and potassium 3,4-diethoxybenzenethiolsulfonate.

2 - (n - propylthio)ethyl 1 - naphthylenethiolsulfonate (molecular weight 326.5) by reacting together 2-chloroethyl n-propyl sulfide and potassium 1-naphthylenethiolsulfonate.

2 - (3,4,5 - trifluorophenylthio)ethyl 2,4 - dimethoxybenzenethiolsulfonate (molecular weight 424.5) by reacting together 2-chloroethyl (3,4,5-trifluorophenyl) sulfide and sodium 2,4-dimethoxybenzenethiolsulfonate.

2 - (4 - tert. - butylphenylthio)ethyl 2 - bromobenzenethiolsulfonate (molecular weight 445.5) by reacting together 2-bromoethyl (4-tert.-butylphenyl) sulfide and potassium 2-bromobenzenethiolsulfonate.

2 - (methylthio)ethyl ethanethiolsulfonate (molecular weight 200.3) by reacting together 2-chloroethyl methyl sulfide and sodium ethanethiolsulfonate.

2-(phenylthio)ethyl benzenethiolsulfonate (molecular weight 310.4) by reacting together 2-chloroethyl phenyl sulfide and potassium benzenethiolsulfonate.

The compounds of the present invention or compositions containing the same, can be applied to pests and their habitats and food in parasiticidal amounts to obtain excellent controls and kills of many organisms. Additionally, the compounds can be included in inks, adhesives, soaps, cutting oils, or oil or latex paints to prevent mold and mildew, and the degradation of such products resulting from microbial attack.

The compounds conveniently can be employed in liquid or dust compositions. In such usage, the compounds are modified with one or a plurality of adjuvents or helpers including water, organic solvents, petroleum oils, petroleum distillates, naphthas or other liquid carriers, surface active dispersing agents and finely divided solids such as chalk, talc or bentonite. Depending upon the concentration of the parasiticide compounds in such formulations, the augmented compositions are adapted to be distributed on plants or plant parts, or in soil, inks, adhesives, cutting oils, paints, textiles, paper, lumber, white or cooling waters, or to be employed as concentrates and subsequently diluted with additional liquid or solid adjuvants to produce the ultimate treating compositions.

The exact concentration of the novel compounds to be employed in the treating compositions is not critical and may vary considerably provided a parasiticidal amount of effective agent is supplied on the plant or plant part or the soil, ink, adhesive, cutting oil, textile, paper, wood and so forth. The concentration of toxicant in liquid compositions generally is from about 1 to 50 percent by weight. Concentrations up to 95 percent by weight oftentimes are conveniently employed. In dusts, the concentration of the toxicant can be from about 1 to 10 percent by weight. In compositions to be employed as concentrates, the toxicant can be present in a concentration of from 5 to 98 percent by weight.

In representative operations, 2 - (methylthio)ethyl methanethiolsulfonate and 2 - (methylthio)ethyl 4-methoxybenzenethiolsulfonate each give complete controls of *Aerobacter aerogenes, Bacillus subtilis, Candida pelliculosa, Salmonella typhosa, Pullularia pullulans, Aspergillus terreus* and *Staphylococcus aureus* at concentrations of 1000 parts per million by weight. In further operations, 2-(methylthio)ethyl 4-methoxybenzenethiolsulfonate gives excellent kills and controls of rice blast, *Cercosphora beticola, Candida albicans* and *Trichophton mentagrophytes* when used in aqueous compositions containing 500 parts per million by weight of the thiolsulfonate compound.

The thiolsulfonates employed as starting materials in accordance with the teachings of the present invention can be prepared in accordance with known methods. In one method, potassium hydrosulfide (KSH) is reacted with a suitable lower alkane-, benzene-, lower alkoxybenzene-, halobenzene, or lower alkylbenzenesulfonyl chloride. Representative halides include 3,5-dimethylbenzenesulfonyl chloride, 4-chloro-2-methylbenzenesulfonyl chloride, 2,4,5-trichlorobenzenesulfonyl chloride, n-propanesulfonyl chloride, n-butanesulfonyl chloride and 2-propanesulfonyl chloride. In a convenient procedure, the reaction is carried out by adding the sulfonyl halide to an aqueous or alcoholic potassium hydroxide solution saturated with $H_2S$. Upon completion of the reaction, the desired starting materials are separated by conventional procedures. The 2-chloroethyl sulfides employed as starting materials in the present application are prepared by known techniques. In a representative known technique an alkyl sodium mercaptide corresponding to the formula

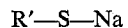

is reacted with 2-chloroethanol in ethyl ether to produce an alkylthio ethanol according to the method of Windus and Shildneck, Org. Syn.; 14 (1934), 54, 55. The alkylthioethanol thus obtained is then reacted with thionyl chloride according to the method of Kirner and Windus, Org. Syn., 14 (1934), 18, to obtain the 2-chloroethyl sulfides. The 2-bromo ethyl aryl sulfides are also prepared by known procedures. In a representative procedure the sodium salt of thiophenol is reacted with ethylene dibromide to form the 2-chloroethyl phenyl sulfide.

I claim:

1. The compound corresponding to the formula

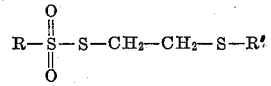

wherein R represents lower alkyl, naphthyl, phenyl and lower alkyl-phenyl, halophenyl or lower alkoxy-phenyl and R' represents lower alkyl, phenyl and lower alkyl-phenyl, halophenyl or lower alkoxy-phenyl.

2. The compound claimed in claim 1 wherein R represents methyl and R' represents methyl.
3. The compound claimed in claim 1 wherein R represents 4-methoxyphenyl and R' represents methyl.
4. The compound claimed in claim 1 wherein R represents 4-iodophenyl and R' represents methyl.
5. The compound claimed in claim 1 wherein R represents methyl and R' represents phenyl.

References Cited

UNITED STATES PATENTS

| | | | |
|---|---|---|---|
| 2,644,385 | 12/1953 | Wolfe et al. | 260—453 |
| 3,153,078 | 10/1964 | Fierce et al. | 260—453 |

CHARLES B. PARKER, *Primary Examiner.*
JOSEPH P. BRUST, *Examiner.*